United States Patent [19]
Mochizuki

[11] Patent Number: 6,088,575
[45] Date of Patent: Jul. 11, 2000

[54] RADIO RECEIVER CAPABLE OF PREVENTING FAILURE TO NOTICE AN IMPORTANT MESSAGE

[75] Inventor: Yasuyuki Mochizuki, Shizuoka, Japan

[73] Assignee: NEC Corporation, Tokyo, Japan

[21] Appl. No.: 09/047,493

[22] Filed: Mar. 25, 1998

[30] Foreign Application Priority Data

Mar. 26, 1997 [JP] Japan ..................................... 9-073374

[51] Int. Cl.⁷ ...................................................... H04Q 7/00
[52] U.S. Cl. ......................................... 455/38.1; 455/32.1
[58] Field of Search ................................... 455/32.1, 466, 455/38.1

[56] References Cited

U.S. PATENT DOCUMENTS

| | | | |
|---|---|---|---|
| 5,652,783 | 7/1997 | Keba | 370/313 |
| 5,654,697 | 8/1997 | Uchida | 340/825.34 |
| 5,678,179 | 10/1997 | Turcotte | 455/331 |
| 5,678,191 | 10/1997 | Eaton | 455/38.1 |
| 5,929,773 | 7/1999 | Nelms | 340/825.44 |
| 5,946,629 | 8/1999 | Sawyer | 455/466 |
| 5,959,544 | 9/1999 | Matsuura | 340/825.44 |

*Primary Examiner*—Daniel S. Hunter
*Assistant Examiner*—Nick Corsaro
*Attorney, Agent, or Firm*—Whitham, Curtis & Whitham

[57] ABSTRACT

A radio paging receiver comprises a receiver section (11) for receiving a transmitted signal having a call signal (ID) and a message signal succeeding the call signal. A decoder section (12) distinguishes whether or not the call signal is coincident with a specific or own call signal (ID) specific to the radio paging receiver to supply a functional control section (14) with the message signal when the call signal is coincident with the specific call signal. The functional control section judges whether or not the message signal is an information message service signal having a keyword and a message data signal. Furthermore, the functional control section judges whether or not the keyword is coincident with an own keyword when the message signal is the information message service signal. The functional control section produces a keyword detection signal when the keyword is coincident with the own keyword. A driving section (18) drives a loudspeaker (19) in response to the keyword detection signal. The functional control section controls a display control section (20) to display the information message service signal as an image message on a display section (21).

11 Claims, 6 Drawing Sheets

| DISTRICT CODE | DISTRICT NAME |
|---|---|
| X51 | SHIZUOKA |
| X52 | IZU |
| X53 | HAMAMATSU |
| X64 | OSHIMA |
| ... | ... |

FIG. 3A

| COMPANY CODE | COMPANY NAME |
|---|---|
| A001 | ○○ ELECTRIC COMPANY |
| A002 | ×× BANK |
| B001 | ○○ DEPARTMENT STORE |
| C001 | ×× PUBLISHING FIRM |
| D002 | ○○ COMMUNICATION COMPANY |
| ... | ... |

FIG. 3B

RADIO RECEIVER CAPABLE OF PREVENTING FAILURE TO NOTICE AN IMPORTANT MESSAGE

BACKGROUND OF THE INVENTION

This invention relates to a radio receiver for receiving a transmitted signal having a message signal as a received signal to obtain the message signal as an information message.

In general, it is known that a conventional radio receiving system comprises a transmission station and a plurality of radio receivers each of which receives a transmitted signal having a message signal as a received signal to obtain the message signal as an information message. The radio receiver may be called a radio paging receiver. The transmitted signal is transmitted from a transmission station to the radio paging receiver. The message signal may have, for example, a weather forecast message or a stock price status message. In case of the weather forecast, it is necessary for the transmission station to transmit a plurality of weather forecast messages to each the radio paging receivers. The weather forecast messages are produced in concern with weather forecast districts, respectively. In case of the stock price status, it is necessary for the transmission station to transmit a plurality of stock price status messages to each of the radio paging receivers. The stock price status messages are produced in concern with companies, respectively.

As readily understood from the above description, the transmission station may transmit a plurality of transmitted signals. The transmitted signals have message signals, respectively, which may be different from one another. A conventional radio paging receiver comprises a reception memory section for memorizing the information messages as memorized information messages. On receiving each of the message signals, the conventional radio paging receiver informs a user of reception of each message signal. More particularly, the conventional radio paging receiver generates a sound on receiving each of the message signals, in order to inform the user of reception of each message signal.

The information messages have different importances at each user. More particularly, a particular one of information messages may be important to one user even if the particular information message is not important to another user. As described above, each of radio paging receiver memorizes all of the information messages as the memorized information message in the message memory section. Therefore, it is difficult to find an important memorized message from a number of memorized messages. The user may fail to notice the important memorized message from the memorized messages.

Inasmuch as each of the radio paging receivers informs the user of reception of each message signal on receiving each of the message signals, power consumption increases in a battery. More particularly, the radio paging receiver generates the sound on receiving each message signal in order to inform the user of reception of each message signal. Inasmuch as the radio paging receiver generates the sound on receiving each message signal, the user may feel the sound as a noise.

SUMMARY OF THE INVENTION

It is therefore an object of this invention to provide a radio paging receiver capable of reducing a power consumption of a battery without failing to notice an importance information message.

Other objects of this invention will become clear as the description proceeds.

On describing the gist of this invention, it is possible to understand that a radio paging receiver is for receiving a transmitted signal having a call signal and a message signal succeeding the call signal.

According to this invention, the radio paging receiver comprises (A) distinguishing means for distinguishing whether or not the call signal is coincident with a specific call signal specific to the radio receiver to receive the message signal when the call signal is coincident with the specific call signal, (B) first judging means for judging whether or not the message signal is an information message service signal having a keyword and a message data signal, (C) second judging means for judging whether or not the keyword is coincident with a own keyword when the message signal is the information message service signal, the second judging means producing a keyword detection signal when the keyword is coincident with the own keyword, and (D) announcing means responsive to the keyword detection signal for announcing a reception of the information message service signal.

BRIEF DESCRIPTION OF THE DRAWINGS

FIGS. 3A and 3B show an example of district codes and company codes;

DESCRIPTION OF THE PREFERRED EMBODIMENT

Figure 1:
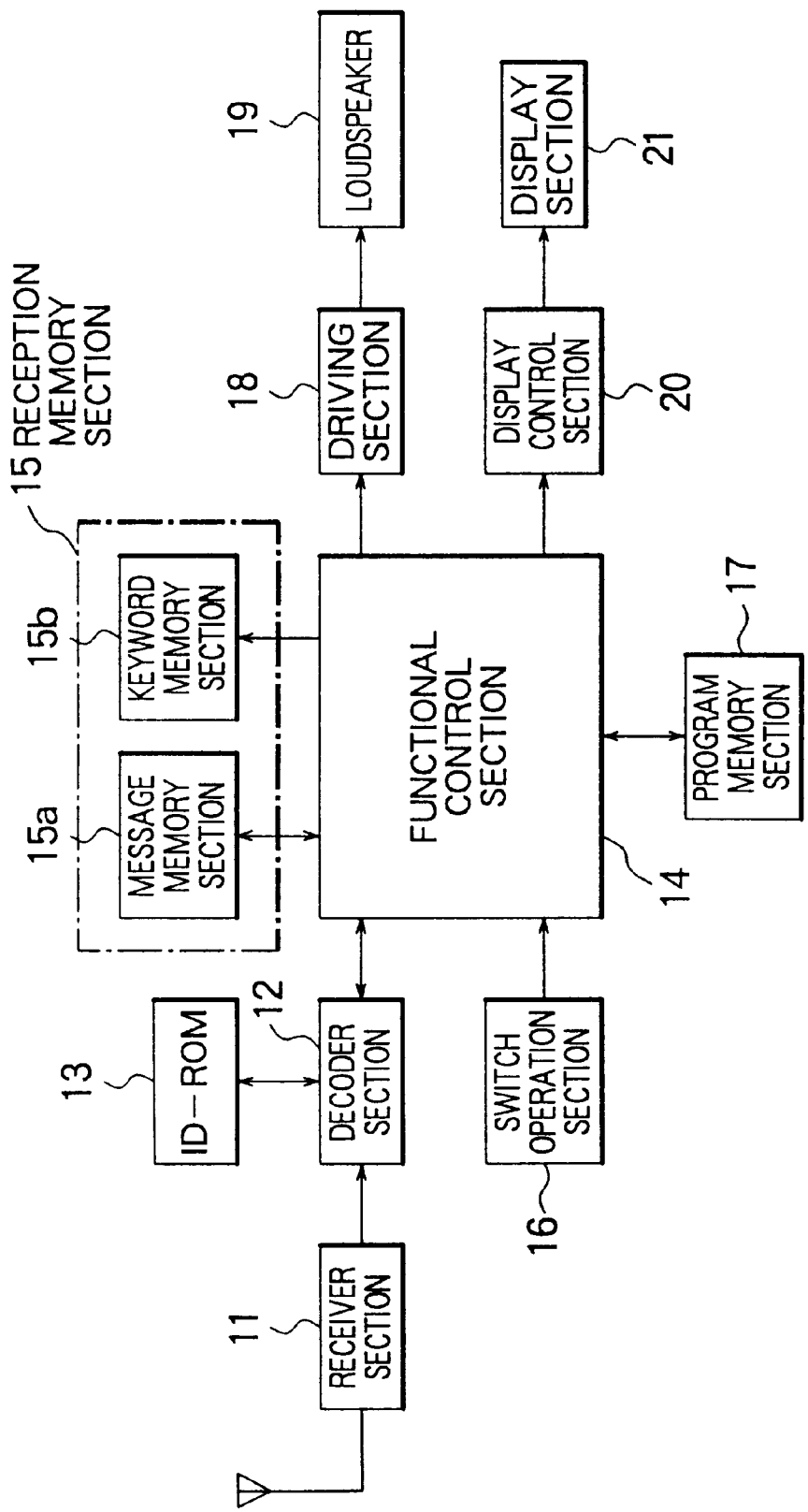
FIG. 1 is a block diagram of a radio paging receiver according to a preferred embodiment of this invention.

Referring to FIG. 1, the illustrated radio paging receiver is for receiving a transmitted signal as a received signal which is transmitted from a transmission station (not shown). The received signal has a call signal and a message signal succeeding the call signal. The radio paging receiver receives the message signal succeeding the call signal when the call signal is specific to the radio paging receiver as will be described later. The call signal may be called an identification code (ID).

Figure 2:
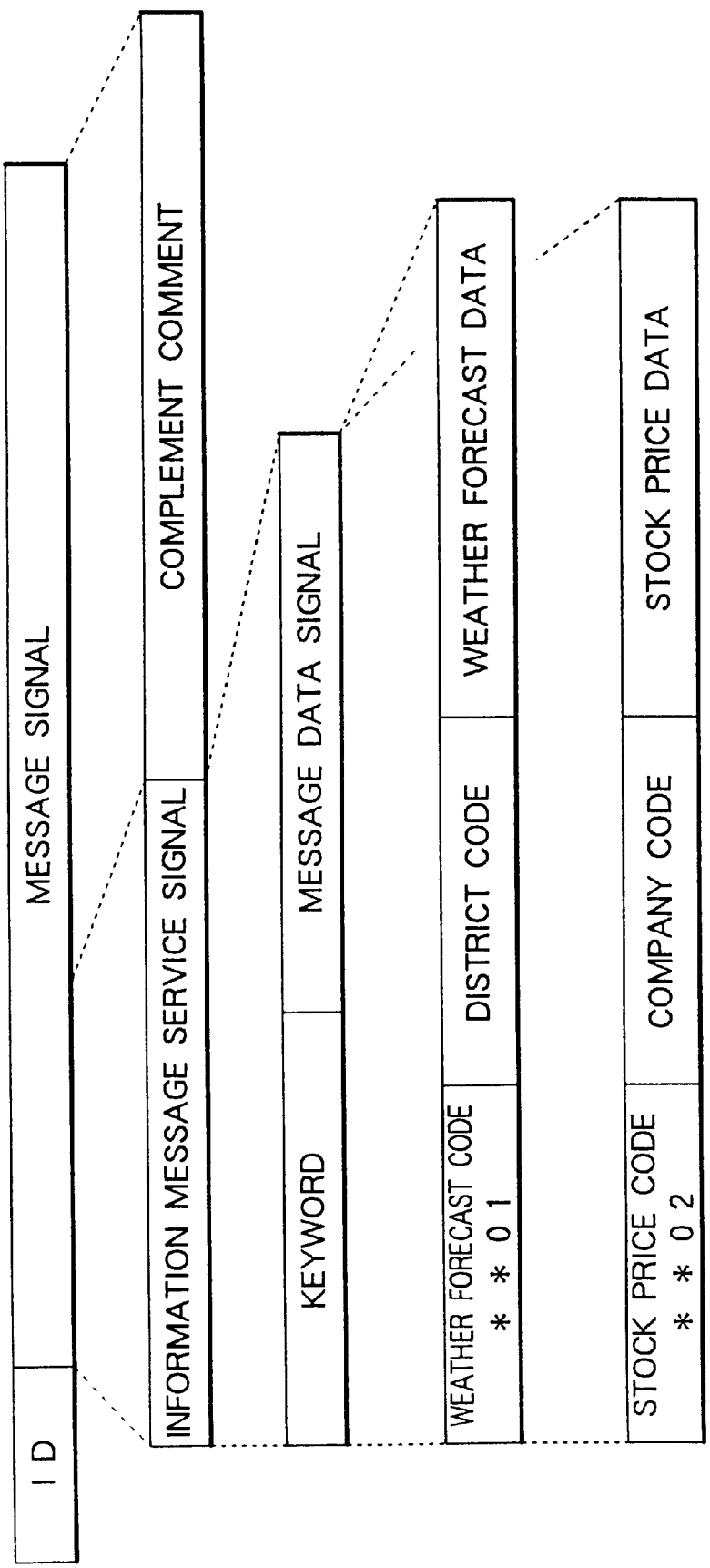
FIG. 2 is a format for illustrating a received signal which the radio paging receiver of FIG. 1 receives.

Referring to FIG. 2, the received signal has the call signal (ID) and the message signal succeeding the call signal as described above. The message signal has an information message service signal and a complement comment succeeding the information message service signal. The information message service signal has a keyword and a message data signal succeeding the keyword.

In case of the weather forecast status, the key word has a weather forecast code of "**01" and a district code succeeding by the weather forecast code. The message data signal is representative of a weather forecast data. In the example being illustrated, the district is representative of "Shizuoka" when the district code is "X51" as shown in FIG. 3A. When the district code is "X52", the district is representative of "Izu". When the district code is "X53", the district is representative of "Hamamatsu". When district code is "X64", the district is representative of "Oshima".

In case of the stock price status, the key word has a stock price code of "**02" and a company or brand code succeeding the stock price code. The message data signal is representative of a stock price data. In the example being illustrated, the company is representative of "∘ electric company" when the company code is "A001" as shown in FIG. 3B. When the company code is "A002", the company is representative of "X X bank". When the company code is "B001", the company is representative of "∘ department store". When company code is "C001", the company is representative of "X X publishing firm". When company code is "D002", the company is representative of "∘ communication company".

Again referring to FIG. 1, the radio paging receiver comprises a receiver section 11 which receives the transmitted signal as the received signal to demodulate the received signal into a demodulated signal. In the example being illustrated, the demodulated signal will be called a baseband signal. The baseband signal is supplied from the receiver section 11 to a decoder section 12.

Supplied with the baseband signal, the decoder section 12 distinguishes whether or not the call signal is specific to the radio paging receiver. More particularly, the radio paging receiver comprises an ID-ROM section 13 for memorizing its own ID code specific to the radio paging receiver. When the baseband signal is supplied to the decoder section 12, the decoder section 12 reads the own ID code out of the ID-ROM section 13. The decoder section 12 detects whether or not the call signal is coincident with the own ID code. When the call signal is coincident with the own ID code, the decoder section 12 supplies the message signal to the functional control section 14.

The radio paging receiver further comprises a reception memory section 15, a switch operation section 16, a program memory section 17, a driving section 18, a loudspeaker 19, a display control section 20, and display section 21. The program memory section 17 stores a control program. The functional control section 14 has a microprocessor and controls the reception memory section 15, the driving section 18, and the display control section 20 in accordance with the control program.

Figure 4:
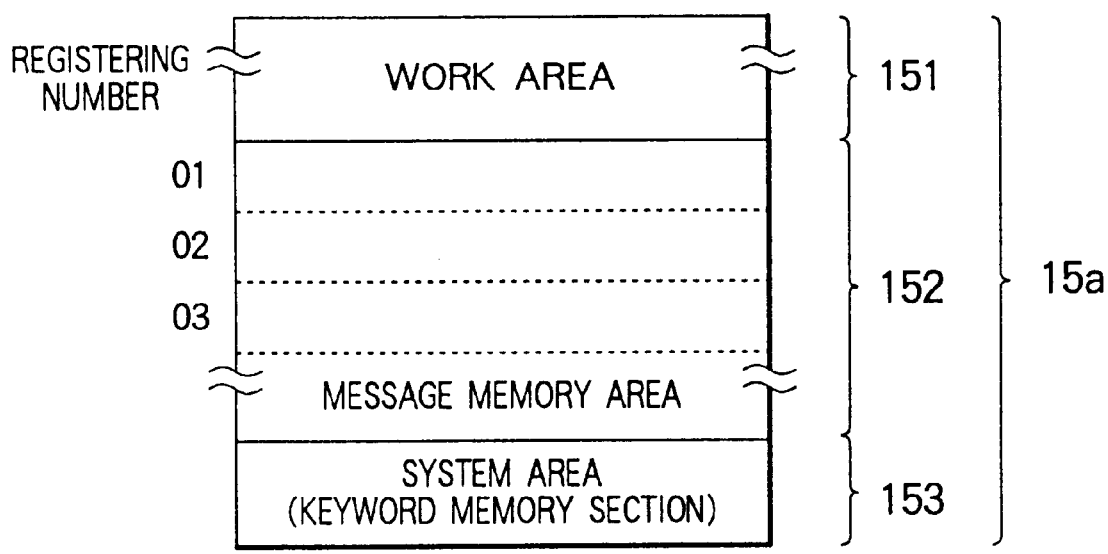
FIG. 4 is a block diagram of a functional control section illustrated in FIG. 1.

Referring to FIG. 4 in addition to FIG. 1, the reception memory section 15 comprises a message memory section 15a and a keyword memory section 15b. The message memory section 15a has a work area 151 and a message memory area 152. The work area 151 is used by the functional control section 14 on working. The message memory area 152 is for memorizing the message signal as a memorized information message. The keyword memory section 15a is for memorizing keywords as registered own keywords each of which is used in distinguishing whether or not the information message service signal is important for the user. The message memory section 15a and the keyword memory section 15b may be formed by one memory device. In this case, a system area 153 is assigned as the keyword memory section 15b as shown in FIG. 4. On registering the keywords in the keyword memory section 15b, the user operates the switch operation section 16 to supply the keywords to the functional control section 14. Supplied with the keywords, the functional control section 14 registers the keywords as the registered own keywords in the keyword memory section 15b as will be described later.

Figure 5:
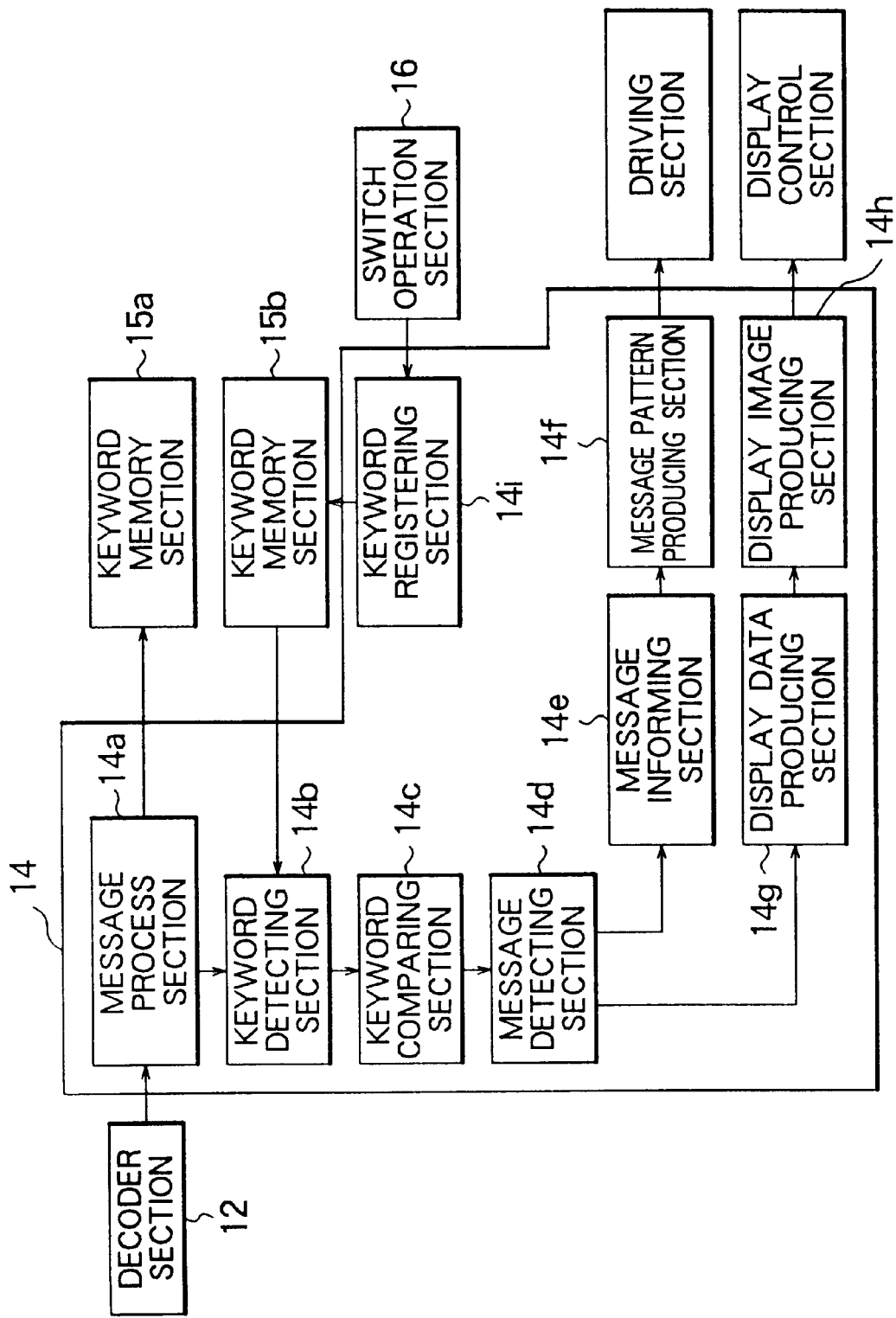
FIG. 5 shows a view of a memory constitution of a message memory section illustrated in FIG. 1.

Referring to FIG. 5, the functional control section 14 comprises a message process section 14a, a keword detecting section 14b, a keyword comparing section 14c, a message detecting section 14d, a message informing section 14e, a message pattern producing section 14f, a display data producing section 14g, a display image producing section 14h, and a keyword registering section 14i.

Figure 6:
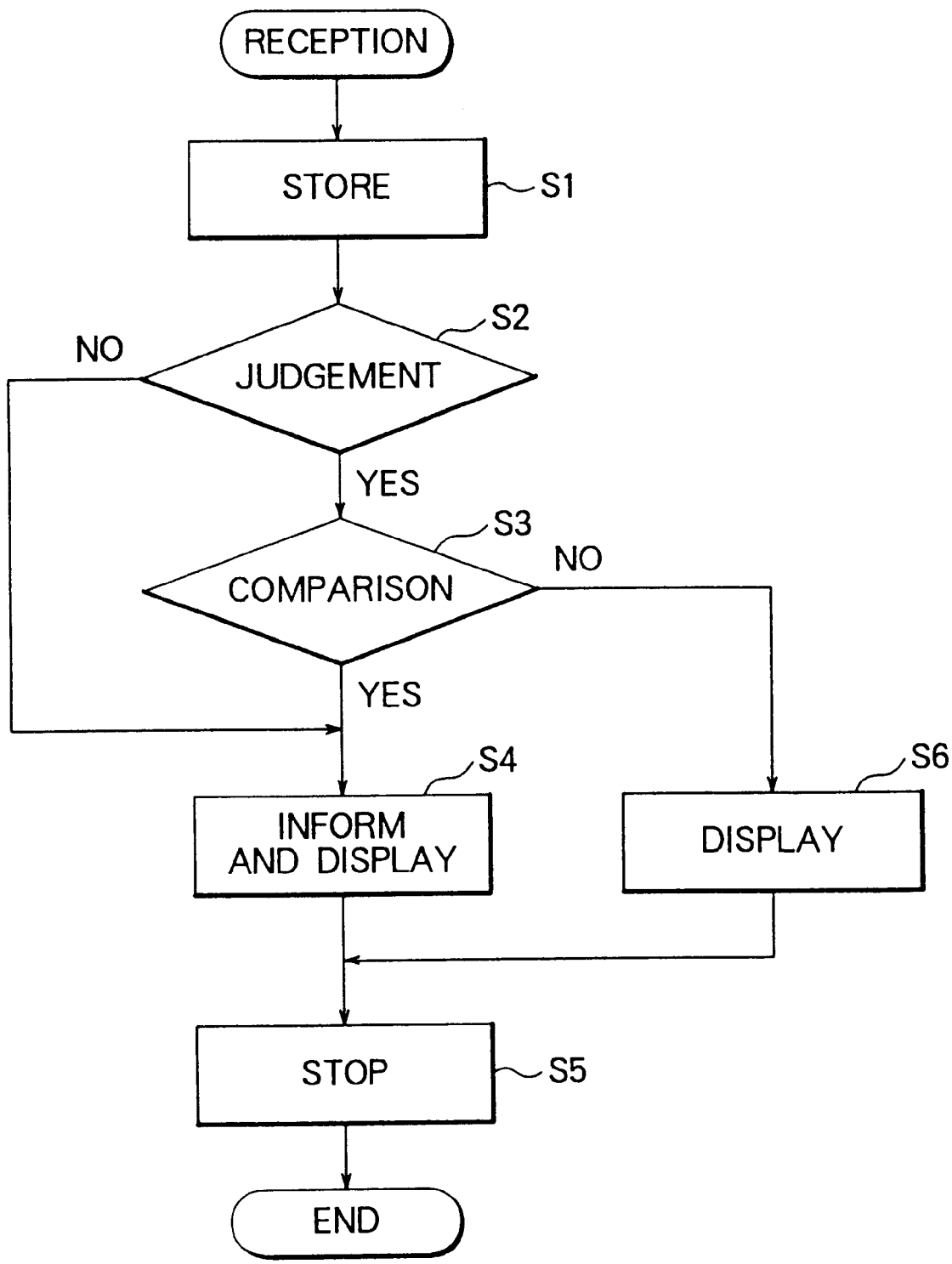
FIG. 6 is a flow chart for describing an operation of the radio paging receiver illustrated in FIG. 1.

Referring to FIG. 5 in addition to FIGS. 1 and 6, the receiving section 11 receives the transmitted signal as the received signal to demodulate the received signal into the baseband signal as described above. Supplied with the baseband signal, the decoder section 12 detects whether or not the call signal is coincident with the own ID code. When the call signal is coincident with the own ID code, the decoder section 12 supplies the message signal to the functional control section 14.

The message signal may include the information message service signal having keyword and the message data signal. Supplied with the message signal, the message process section 14a stores the message signal as the memorized information message in the message memory section 15a at a first step S1 labelled "STORE" in FIG. 6. The message process section 14a judges whether or not the message signal includes the information message service signal at a second step S2 labelled "JUDGEMENT" in FIG. 6. When the message signal includes the information message service signal, the message process section 14a supplies the information message service signal to the keyword detecting section 14b. The keyword detecting section 14b detects whether or not the information message service signal has the keyword. When the information message service signal has the keyword, the keyword detecting section 14b detects the keyword as a detected keyword. The keyword detecting section 14b reads all of the registered own keywords out of the keyword memory section 15b. The keyword detecting section 14b supplies the keyword comparing section 14c with the detected keyword, the registered own keywords, and the information message service signal.

The keyword comparing section 14c compares the detected keyword with each of the registered own keywords at a third step S3 labelled "COMPARISON" in FIG. 6. When a specific one of the registered own keywords is coincident with the detected keyword, the keyword comparing section 14c judges the information message service signal is important for the user. When the keyword comparing section 14c judges the information message service signal is important for the user, the keyword comparing section 14c produces a keyword detection signal and gives the message detecting section 14d the information message service signal and the keyword detection signal. The message detecting section 14d detects whether or not the the information message service signal has the message data signal. When the information message service signal has the message data signal, the message detecting section 14d detects the message data signal as a detected message data signal.

In response to the keyword detection signal, the message detecting section 14d drives the message informing section 14e to supply the keyword detection signal to the message informing section 14e. The message informing section 14e informs the message pattern producing section 14f of the keyword detection signal. In response to the keyword detection signal, the message pattern producing section 14f produces a predetermined message pattern to supply the predetermined message pattern to the driving section 18 at a fourth step S4 labelled "INFORM AND DISPLAY" in FIG. 6. In accordance with the predetermined message pattern, the driving section drives the loudspeaker 19 in order to inform the user of reception of the message data signal. After a predetermined time duration lapses, the message pattern producing section 14f stops supplying the predetermined message pattern to the driving section 18 at a fifth step S5 labelled "STOP" in FIG. 6. As a result, the driving section 18 stops driving the loudspeaker 19.

Furthermore, the message detecting section 14d supplies the detected message data signal to the display data producing section 14g when the message detecting section 14d detects the detected message data signal. In accordance with the detected message data signal, the display data producing section produces a display data signal to supply the display data signal to the display image producing section 14h. In response to the display data signal, the display image producing section 14h produces a display image signal to supply the display image signal to the display control section 20 at the fourth step S4. The display control section 20 controls the display section 21 in accordance with the display image signal to display the display image signal as a message image on the display section. After the predetermined time duration lapses, the display image producing section 14h stops supplying the display image to the display control section 20 at the fifth step S5. As a result, the display control section 20 stops displaying the image message on the display section 21.

On the otherhand, the keyword comparing section 14c does not produce the keyword detection signal when the detected keyword is not coincident with all of the registered own keywords. The keyword comparing section 14c supplies only the information message service signal to the message detecting section 14d. Supplied with the information message service signal, the message detecting section 14d detects the message data signal as the detected message data signal when the information message service signal has the message data signal. Inasmuch as the keyword detection signal is not supplied to the message detecting section 14d, the message detecting section 14d does not drive the message informing section 14e. In order to display the message image on the display section 21, the message detecting section 14d supplies the detected message data signal to the display data producing section 14g at a sixth step S6 labelled "DISPLAY" in FIG. 6, when the message detecting section 14d detects the detected message data signal. After the predetermined time duration lapses, the display image producing section 14h stops supplying the display image to the display control section 20 at the fifth step S5. As a result, the display control section 20 stops displaying the image message on the display section 21.

The message signal may not have the information message service signal. More particularly, the message signal may be a general message signal which is representative of a general message such as a telephone number or an address. When the message signal may be a general message signal, the message process section 14a stores the general message signal as the memorized information message in the message memory section 15a. Furthermore, the message process section 14a informs the message detecting section 14d of the general message signal although the message process section 14a is not coupled to the message detecting section 14d in FIG. 5. In response to the general message signal, the message detecting section 14d drives the message informing section 14e. Furthermore, the the message detecting section 14d supplies the general message signal to the display data producing section 14g. As a result, the driving section 18 drives the loudspeaker 19 in order to inform the user of reception of the general message signal. The display control section 20 displays the general message signal as an image on the display section 21.

As known in the art, it is possible to display the content of the message memory section 15a on the display section 21 under control of the functional control section 14 when the switch operation section operates on a reproduction mode.

While this invention has thus far been described in conjunction with the preferred embodiment thereof, it will readily be possible for those skilled in the art to put this invention into practice in various other manners.

What is claimed is:

1. A radio receiver for receiving a transmitted signal having a call signal and a message signal succeeding said call signal, said radio receiver comprising:

distinguishing means for distinguishing whether or not said call signal is coincident with a specific call signal specific to said radio receiver to receive said message signal when said call signal is coincident with said specific call signal;

first judging means for judging whether or not said message signal is an information message service signal having a keyword and a message data signal;

second judging means for judging whether or not said keyword is coincident with an own keyword when said message signal is said information message service signal, said second judging means producing a keyword detection signal when said keyword is coincident with said own keyword;

display means for displaying all received message data for said radio receiver; and announcing means responsive to said keyword detection signal for announcing a reception of the information message service signal and for announcing a reception of a message when no keyword is present in said message signal.

2. A radio receiver as claimed in claim 1, wherein said radio receiver further comprises memory means for memorizing said message signal when said call signal is coincident with said specific call signal.

3. A radio receiver as claimed in claim 2, wherein said radio receiver further comprises:

switch means operated by a user for producing a read command; and reading means responsive to said read command for reading said message signal out of said memory means to display said message signal as an image message on said display means.

4. A radio receiver as claimed in claim 1, wherein said radio receiver further comprises display means for displaying said message signal as an image message on a display unit when said call signal is coincident with said specific call signal.

5. A radio receiver as claimed in claim 1, wherein said radio receiver further comprises register means for registering said own keyword as a registered own keyword.

6. A radio receiver as claimed in claim 5, wherein said register means comprises:

switch means operated by a user for generating said own keyword as a generated keyword; and memory means supplied with said generated keyword for memorizing said generated keyword as said registered keyword.

7. A radio receiver as claimed in claim 1, wherein said keyword has either of first and second keywords.

8. A radio receiver as claimed in claim 7, wherein said first keyword has a weather forecast code and a district code succeeding said weather forecast code, said district code being succeeded by said message data signal representative of a weather forecast data.

9. A radio receiver as claimed in claim 7, wherein said second keyword has a stock price code and a company code succeeding said stock price code, said company code being succeeded by said message data signal representative of a stock price data.

10. A radio receiver as claimed in claim 1, wherein said announcing means comprises:

a loudspeaker; and control means responsive to said keyword detection signal for controlling said loudspeaker to make said loudspeaker generate a sound representative of reception of said information message service signal.

11. A method for displaying all messages received for a radio pager but preventing failure to notice a message deemed important to a user, comprising:

storing a unique identification code specific to a radio pager;

storing at least one keyword selected by a user identifying an important message to the user;

receiving a signal containing identification code data and message data, said signal further comprising keyword data identifying a type of said message data if said signal is from a subscriber service;

comparing said received identification code data with said unique identification code to determine an identification match;

displaying said message data for a user to read if said identification match is determined;

comparing said received keyword data to said at least one keyword selected by the user to determine a keyword match;

alerting the user that said message data is being displayed if said keyword match is determined; and alerting said user that said message data is being displayed if no keyword is present in said received signal.

* * * * *